United States Patent [19]

Leenhouts

[11] 4,034,277

[45] July 5, 1977

[54] PULSE TO STEP ERROR SENSING CIRCUIT

[75] Inventor: Albert C. Leenhouts, Harwinton, Conn.

[73] Assignee: The Superior Electric Company, Bristol, Conn.

[22] Filed: Aug. 13, 1975

[21] Appl. No.: 604,318

[52] U.S. Cl. .............................. 318/685; 318/565; 340/248 P; 340/271

[51] Int. Cl.² ........................................ G05B 19/40

[58] Field of Search ................. 318/685, 696, 565; 340/213 Q, 248 P, 271, 268

[56] References Cited

UNITED STATES PATENTS

| 3,435,314 | 3/1969 | Bradley et al. | 318/138 |
| 3,792,460 | 2/1974 | Ratz | 340/271 |
| 3,798,431 | 3/1974 | Schulkind et al. | 235/151.12 |

Primary Examiner—Robert K. Schaefer
Assistant Examiner—John J. Feldhaus
Attorney, Agent, or Firm—Ernest M. Junkins

[57] ABSTRACT

A circuit for supplying an error signal when the instantaneous difference between the number of command pulses and the number of steps produced by a stepping motor exceeds a value from which the motor cannot recover to overcome the difference.

6 Claims, 1 Drawing Figure

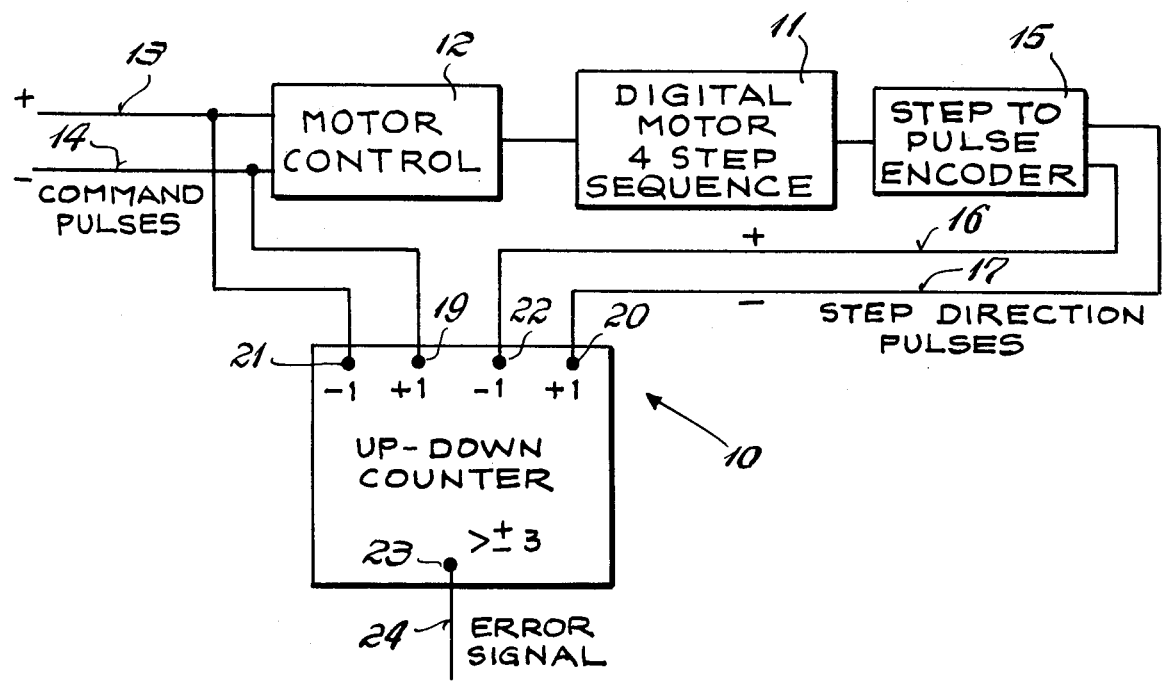

PULSE TO STEP ERROR SENSING CIRCUIT

In digital control systems, a command pulse is supplied for each step that a digital motor, such as a stepping motor, is to produce. Each command pulse, through a motor control, changes the energization of the motor windings for each pulse and the change in energization normally causes the motor to produce the step. Each command pulse is provided with the assumption that a step will be produced and if it fails to produce each step, the system becomes generally unsatisfactory.

In many systems, however, the instantaneous motor position lags somewhat behind the instantaneous energization and thus there is an instantaneous difference between the number of command pulses applied and the number of steps that the motor has produced. In some systems, the difference is monitored and used to control the power to and hence movement of the motor so that elimination of the difference is assured. However in a stepping motor whose movement is set by changes of energization and not by the power thereto, the difference is incapable of controlling motor movement. Moreover, though some values of instantaneous difference may be overcome by the motor, it has been found that when such motors have their changes of energization occur as a repeated sequence, that if the value of the instantaneous difference at least equals the number of changes in a sequence, then the motor cannot recover or overcome the difference.

It is accordingly an object of the present invention to provide an error sensing system that produces an error signal if the value of the instantaneous difference between the motor steps and the command pulses is such as to assuredly prevent the motor from being able to recover or eliminate the difference.

Another object of the present invention is to achieve the above object with a system that produces the error signal as soon as the difference becomes unrecoverable.

A further object of the present invention is to provide a pulse to step error sensing circuit that is extremely simple in construction, composed of few parts, reliable and durable in use and capable of being applied to many types of stepping motors.

The pesent invention is used with a stepping motor whose changes of energization are made according to repeating sequences with each sequence being identical and having a plurality of changes of energization that follow a set pattern. When the number of motor steps lags the number of command pulses by an instantaneous difference that is less than the number of steps in a sequence, the motor has been found to be normally capable of catching up or recovering to overcome the difference. However, when the difference becomes at least equal to the number of changes in a sequence, the motor becomes incapable of recovering as it automatically loses the sequence represented by the difference and assumes that it is in coincidence with the identical change of energizaton of the next sequence. In this situation, the motor cannot recover the difference and an irreversible error is introduced into the system.

The error sensing system of the present invention utilizes the above principle and provides a counter which maintains a count of the instantaneous difference. Additionally, it is set to produce an error signal when the difference is greater than one less than the number of steps in a sequence. In this manner irrespective of when such a difference valve occurs, an error signal is produced. The error signal may be utlized in many different ways, as for example, to stop motor motion, to permit continuation of motion until a desired time or event is reached, to provide a signal to an operator, etc.

Other features and advantages will hereinafter appear.

Referring to the drawing:

The sole FIGURE is a block diagram of the error sensing circuit of the present invention.

In the drawing, the system is generally indicated by the reference numeral 10 and includes a digital motor 11 which receives changes of energization rom a motor control 12 with each change of energization being produced in response to receipt of a command pulse. Command pulses are received by the motor control 12 on a plus direction lead 13 or a minus direction lead 14 in order to control the direction of motor movement.

The output of the digital motor is connected to a step to pulse encoder 15 which produces a pulse on a lead 16 for each step in a plus direction and a pulse on the lead 17 for each step in the opposite direction.

The system further includes an up-down counter 18 having four input terminals 19, 20, 21 and 22. The terminals 19 and 21 are connected to the command pulse leads 13 and 14, respectively while the encoder pulse leads 16 and 17 are connected to the terminals 22 and 20, respectively. With this construction when a plus command is received on a lead 13 it causes the counter 18 to increase its count by one while if the motor takes a step in the plus direction it produces a pulse on the lead 16 which decrements the counter by one thereby providing an instantaneous count in the counter 18 of the difference between the number of command pulses received and the number of encoder pulses or steps produced by the motor for movement in one direction.

Similarly for movement in the other direction, the counter will increment in the opposite direction, i.e. negatively, for each negative direction command pulse on the lead 14 and will increment positively for each negative direction step appearing on the lead 17.

As indicated in the block 11, the digital motor has a four step sequence which if its winding sets are denoted A, A', B and B' will be energized according to the sequence AB, AB', A'B', A'B; AB, etc. With this embodiment of a motor the counter 18 is constructed to provide a terminal 23 which senses whenever the count of the counter is greater than 3, either positively or negatively, and produces on a lead 24 connected thereto an error signal. Accordingly, whenever the difference is greater than one less than the number of steps in a sequence, or at least equals the number in a sequence the counter will produce the error signal.

While the above specific embodiments relate to a four step sequence motor, it will be understood that if an eight step sequence is employed that instead of using a count of three that the counter would be set to produce an error signal whenever a count was greater than plus or minus seven. For sequences having a different number, then the count at which the error signal is produced will also change.

While the herein described embodiment merely shows the producing of an error signal, it will be clear that such a signal may be used in many ways. For example, the system could be utilized to operate a slide hold circuit which stops further pulses and decelerates the motor to a stopped condition; or the signal may be used to provide an operator sensible indication; or the signal could be used to enable completion of the motion but yet prevent initiation of a subsequent movement. Moreover, if desired, the error signal can also be interconnected with an oscillator circuit that could provide command pulses which are needed to reduce the counter count to zero and hence overcome the error.

It should be noted that with changes of energization types of stepping motors, the specific change which the motor attains at its stopped or final position may be sensed. This could be compared to the change which the number of command pulses require. However this comparison would not produce an error signal if the motor had lost or not produced a number of steps equal to the number of changes in a sequence.

It will accordingly be understood there has been disclosed a system for sensing the instantaneous difference between the number of steps produced by a stepping motor and the number of steps that it is commanded to produce. The system permits a difference to occur which is within the motor's ability to recover or catch up but yet provides an error signal whenever the difference becomes so great that the motor is inherently incapable of overcoming the difference. This difference has been found to be at least equal to the number of changes of energization in a repeating sequence for such a stepping motor.

Variations and modifications may be made within the scope of the claims and portions of the improvement may be used without others.

I claim:

1. An error sensing system for use in a digital motor system that accepts command pulses and is to produce a step for each pulse comprising a digital motor of the type that is to produce a step for each change of energization with the changes occuring in a repeatable sequence with each sequence having the same set plural number and pattern of changes, means for changing the energization of the motor to produce a step for each command pulse received, means for sensing that the motor has produced a step, means for maintaining a count of the instantaneous difference between the number of command pulses and the number of steps and means for providing an error signal only when the count of the instantaneous difference has a value from which the motor is incapable of overcoming which is when the instantaneous count difference is greater than one less than the set number of changes in a sequence.

2. The invention as defined in claim 1 in which the error signal producing means is rendered inoperative to produce an error signal when the count difference is equal to or less than one less than the set number of changes in a sequence.

3. The invention as defined in claim 1 in which the motor is reversible, in which there is one pattern of changes in a sequence for movement in one direction and another pattern of changes in a sequence for movement in the other direction, in which both patterns have the same set number and in which the error signal producing means is operative to produce an error signal for either direction of movement.

4. The invention as defined in claim 1 in which the error signal producing means includes an up-down counter having one incrementing terminal connected to receive command pulses, in which the means for sensing provides a step pulse for each step produced and in which the counter has a decrementing terminal connected to receive the step pulses.

5. The invention as defined in claim 4 in which there are another command pulses for directing movement in another direction, in which the means for sensing produces another step pulses for movement in the reverse direction, in which the another command pulses are connected to be received by a decrementing terminal in the counter and in which the another step pulses are connected to be received by an incrementing terminal in the counter.

6. The invention as defined in claim 5 in which the error signal producing means produces a signal irrespective of the algebraic sign of the instantaneous count of the counter.

* * * * *